United States Patent [19]

Alexander

[11] Patent Number: 5,696,615
[45] Date of Patent: *Dec. 9, 1997

[54] WAVELENGTH DIVISION MULTIPLEXED OPTICAL COMMUNICATION SYSTEMS EMPLOYING UNIFORM GAIN OPTICAL AMPLIFIERS

[75] Inventor: Stephen B. Alexander, Millersville, Md.

[73] Assignee: Ciena Corporation, Linthicum, Md.

[*] Notice: The term of this patent shall not extend beyond the expiration date of Pat. No. 5,532,864.

[21] Appl. No.: 554,976

[22] Filed: Nov. 13, 1995

[51] Int. Cl.⁶ ........................................... H04J 14/02
[52] U.S. Cl. ..................... 359/134; 359/130; 359/179; 359/341
[58] Field of Search ..................... 359/124, 130, 359/134, 160, 173, 179, 341; 372/6

[56] References Cited

U.S. PATENT DOCUMENTS

| | | | |
|---|---|---|---|
| 5,185,826 | 2/1993 | Delavaux | 359/134 |
| 5,225,922 | 7/1993 | Chraplyvy et al. | 359/124 |
| 5,260,823 | 11/1993 | Payne et al. | 359/341 |
| 5,406,404 | 4/1995 | DiGiovanni et al. | 359/161 |
| 5,457,562 | 10/1995 | Tremblay | 359/134 |
| 5,532,864 | 7/1996 | Alexander et al. | 359/160 |

OTHER PUBLICATIONS

OSA Proc. *Optical Amplifiers And Their Applications*, Jun. 15–17, 1995, pp. v–xi.

Sugaya et al., "Novel Configuration for low–noise and wide–dynamic range Er–doped fiber amplifier for WDM Systems," *Optical Amplifiers . . .*, Jun. 15, 1995, pp. 158–161.

Nilsson et al., "AC Gain Tilt With Gain Compression in Erbium Doped Fiber Amplifiers," *Optical Amplifiers . . .*, Jun. 15, 1995, pp. 154–157.

Chou et al., "Inhomogeneous Gain Saturation of Erbium–Doped Fiber Amplifiers," *Optical Amplifiers . . .*, Jun. 15, 1995, pp. 92–95.

(List continued on next page.)

*Primary Examiner*—Kinfe-Michael Negash
*Attorney, Agent, or Firm*—Margaret Burke

[57] ABSTRACT

The present invention provides an improved wavelength division multiplexed optical communication system which includes optical amplifiers having substantially uniform gain in the spectral region from 1540 to 1560 nm. The WDM optical communication system includes an optical transmission line optically communicating with plural optical signal sources for carrying a wavelength division multiplexed optical communication signal. At least one optical amplifier is positioned in the optical transmission line for amplifying the wavelength division multiplexed optical communication signal. The amplifier has at least two amplifier stages. The first amplifier stage includes a first length of rare-earth doped optical fiber and the second amplifier stage includes a second length of rare-earth doped optical fiber. At least one passive optical component is positioned between the first and second amplifier stages selected from optical isolators, optical filters, optical circulators, Bragg gratings, and wavelength division multiplexers. A first optical pump which outputs a pump signal at a first wavelength optically communicates with the first amplifier stage and a second optical pump which outputs a second pump signal at a second wavelength optically communicates with the second amplifier stage. The first and second lengths of the rare-earth-doped optical fiber and the first and second optical pump signals are selected such that the gain of the first amplifier stage has a first gain slope within the spectral region of the multiplexed optical signal and the second amplifier stage has a second gain slope within the spectral region of the multiplexed optical signal. The first and second gain slopes are configured such that the composite of the first gain slope and the second gain slope produces a substantially constant gain within a spectral region from 1540 to 1560 nm.

18 Claims, 8 Drawing Sheets

OTHER PUBLICATIONS

Georges, "EDFA gain equalization with fiber filter for WDM systems," *Optical Amplifiers* . . . , Jun. 15, 1995, pp. 48–51.

Fukada et al., "Gain–Peak Wavelength Controllable Erbium–Doped Fiber Amplifier for Long–Haul WDM Transmission," *Optical Amplifiers* . . . , Jun. 15, 1995, pp. 36–39.

Belov et al., "Gain Spectrum Flattening of Erbium–Doped Fiber Amplifier Using Tapered Fiber Filter," *Optical Amplifiers* . . . , Jun. 15, 1995, pp. 32–35.

Bjarklev *Optical Fiber Amplifiers: Design and System Applications*, (Artech House, Boston), c. 1993, pp. vii–xii, 193–220.

Gowar, *Optical Communication Systems*, (Prentice–Hall, New York), c. 1992, pp. v–xiv.

*Optical Amplifiers and Their Applications*, OSA Conference Proceedings, pp. iii–x; 157–181.

Desurvire, *Erbium–Doped Fiber Amplifiers: Principles and Applications*, (John Wiley & Sons, New York), c. 1994, pp. ix–xi; 319–405.

WAVELENGTH DIVISION MULTIPLEXED OPTICAL COMMUNICATION SYSTEMS EMPLOYING UNIFORM GAIN OPTICAL AMPLIFIERS

FIELD OF THE INVENTION

The invention relates to wavelength division multiplexed optical communication systems and, more particularly, to wavelength division multiplexed optical communication systems which include multiple stage optical amplifiers exhibiting uniform gain across the spectral range of the multiplexed optical signals.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each information source, the complete signal being constructed from the signal portions created for each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. A WDM system employs plural optical signal channels, each channel being assigned a particular channel wavelength. In a WDM system, signal channels are generated, multiplexed, and transmitted over a waveguide. At the receiving end, the optical signal is demultiplexed such that each channel wavelength is individually routed to a designated receiver. Through the use of optical amplifiers, such as doped fiber amplifiers, plural optical channels are directly amplified simultaneously, facilitating the use of WDM systems in long-distance optical systems.

While optical amplifiers are useful for amplifying optical signals, doped fiber amplifiers typically do not amplify optical signals uniformly across their spectral gain region. FIG. 1 shows the gain of a typical erbium-doped fiber amplifier as a function of wavelength. As seen in FIG. 1, the amount of gain for an erbium amplifier varies considerably within the spectral region of 1525 to 1580 nm. For example, an optical channel at a wavelength of 1540 nm will be amplified 4 dB more than an optical channel at a wavelength of 1555 nm. While this discrepancy can be tolerated for a system with only one optical amplifier or with a single optical channel, it cannot be tolerated for a system with plural optical amplifiers or numerous, narrowly-spaced optical channels ("dense" WDM, i.e., channel spacings on the order of 0.5–1.5 nm). In these environments, channels in a lower gain region of the amplifier, after several successive amplifications, will eventually become indistinguishable from background noise.

Several approaches have been adopted for minimizing the effects of the unequal gain of erbium-doped fiber amplifiers. In U.S. Pat. No. 5,405,404 to DiGiovanni et al., gain peaking is mitigated in a chain of doped-fiber amplifiers by pumping each optical amplifier in the chain at a particular wavelength to produce gain over a specified wavelength range. In this technique, the amplifiers are pumped at wavelengths less than 1400 nm. While the gain spectrum is relatively flat when only one amplifier is used, as more amplifiers are added in the amplifier chain, from 1 to 4 as depicted in FIGS. 4 and 5, gain performance of the best and worst channels varies by about 7 dB. This variation is not acceptable for dense WDM systems.

Another approach to flattening the gain in a spectral region of doped-fiber amplifiers is depicted in U.S. Pat. No. 5,260,823 to Payne et al. Payne et at. employ optical filters positioned between two stages of an optical amplifier to shape the spectral gain characteristics of an erbium-doped fiber amplifier. A band rejection filter is chosen so that the larger gain at the peak wavelength (approximately 1531 nm) is diminished to promote more uniform gain in the region from 1529 to about 1560 nm. Although this configuration decreases one of the major gain peaks in the erbium gain spectrum, there is still substantial deviation in the amount of gain across the spectrum, an unacceptable condition for many WDM optical systems.

A further approach to mitigating the effects of the unequal gain spectrum of erbium-doped fiber amplifiers is described in U.S. Pat. No. 5,225,922 to Chraplyvy et at. In this patent, processing apparatus is provided which selectively equalizes the optical signal-to-noise ratios of the channels in a WDM system by dynamically adjusting the optical signal input powers. This technique compensates for the unequal gain provided by the optical amplifier over the channel spectrum. However, the use of this compensation technique requires microprocessors, feedback loops, and source optical signal power adjusters, greatly increasing the complexity of the optical communication system.

Thus, there is a need in the art for improved wavelength division multiplexed optical communication systems which include optical amplifiers with a uniform gain across a spectral region of interest. Such WDM optical communication systems can be used for dense wavelength division optical multiplexing applications.

SUMMARY OF THE INVENTION

The present invention provides an improved wavelength division multiplexed optical communication system which includes optical amplifiers having substantially uniform gain in the spectral region from about 1540 to 1560 nm. The WDM optical communication system includes an optical transmission line optically communicating with plural optical signal sources for carrying a wavelength division multiplexed optical communication signal. At least one optical amplifier is positioned in the optical transmission line for amplifying the wavelength division multiplexed optical communication signal. The amplifier has at least two amplifier stages. The first amplifier stage includes a first length of rare-earth doped optical fiber and the second amplifier stage includes a second length of rare-earth doped optical fiber. At least one passive optical component is positioned between the first and second amplifier stages selected from optical isolators, optical filters, optical circulators, Bragg gratings, and wavelength division multiplexers. A first optical pump which outputs a pump signal at a first wavelength optically communicates with the first amplifier stage and a second optical pump which outputs a second pump signal at a second wavelength optically communicates with the second amplifier stage. The first and second lengths of the rare-earth-doped optical fiber and the first and second optical pump signals are selected such that the gain of the first amplifier stage has a first gain slope within the spectral region of the multiplexed optical signal and the second amplifier stage has a second gain slope within the spectral region of the multiplexed optical signal. The first and second gain slopes are configured such that the composite of the first gain slope and the second gain slope produces a substantially constant gain within a spectral region from 1540 to 1560 nm.

DETAILED DESCRIPTION

Figure 2:
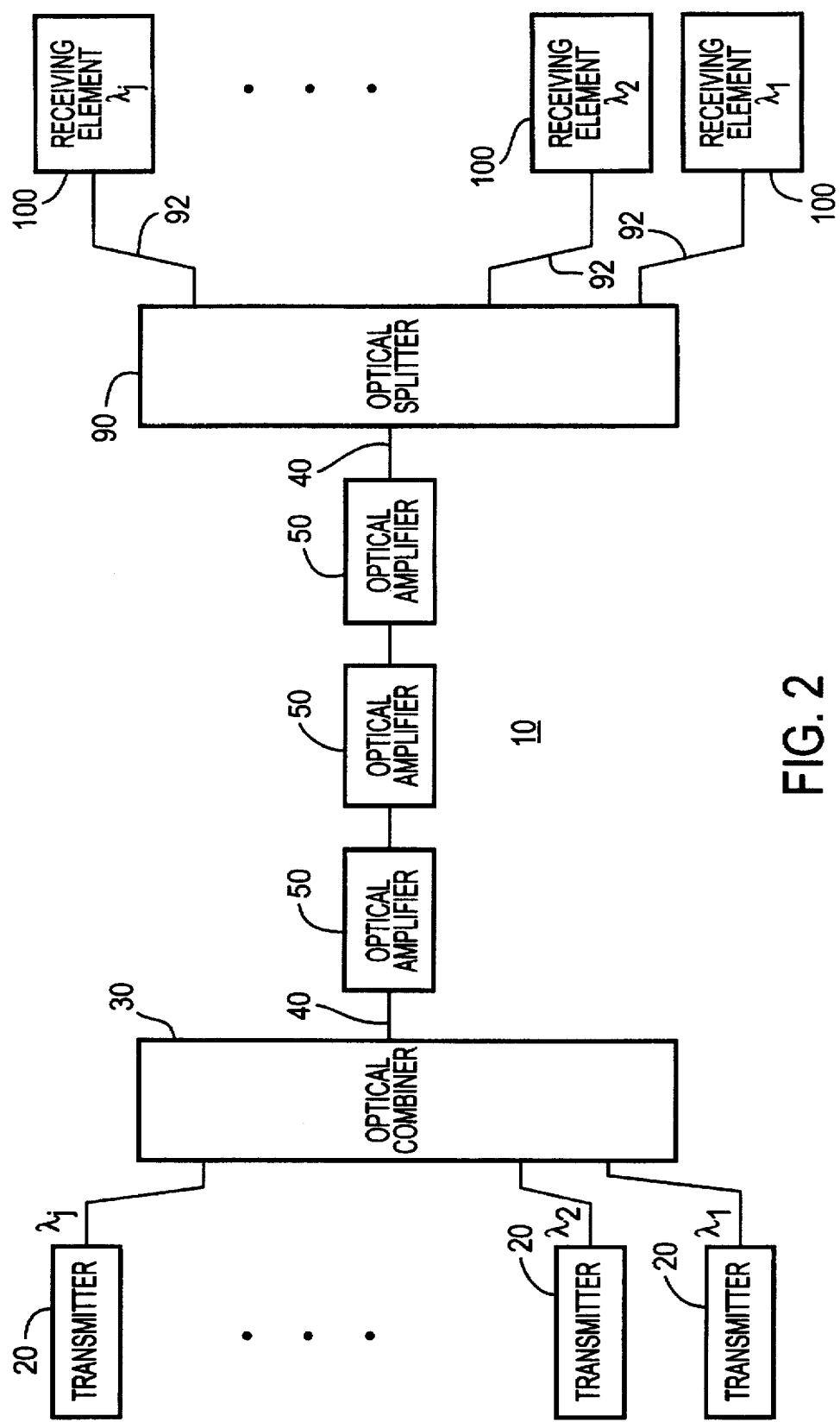
FIG. 2 is a schematic representation of a wavelength division multiplexed optical communication system according to one embodiment of the present invention.

Turning now to the drawings in detail in which like numerals indicate the same or similar elements in each of the views, FIG. 2 depicts a wavelength division multiplexed optical communication system 10 according to one embodiment of the present invention. Wavelength division multiplexed optical communication system 10 includes a plurality of optical transmitters 20, each optical transmitter emitting an information-bearing optical signal at a transmission wavelength. The expression "information-bearing optical signal," as used herein, refers to an optical signal which has been coded with information, including, but not limited to, audio signals, video signals, and computer data. Each optical transmitter 20 generally includes a laser, such as a DFB semiconductor laser, a laser controller, and a modulator for creation of an information-bearing optical signal. In an exemplary embodiment, the transmitter laser is a DFB semiconductor diode laser, generally comprising one or more III–V semiconductor materials, commercially available from a wide variety of suppliers such as Fujitsu, GEC Marconi, Sea Star, Alcatel, and Hewlett-Packard. The laser outputs an optical carrier signal at a particular channel wavelength corresponding to a demultiplexer wavelength included in a receiving system. The laser controller provides the required laser bias current as well as thermal control of the laser. Using thermal control, the precise operating wavelength of the laser is maintained, typically to within a one angstrom bandwidth.

The optical transmitter further includes a modulator for imparting information to the optical carrier signal. An exemplary modulator is an external modulator, such as a Mach-Zehnder modulator, employing a waveguiding medium whose refractive index changes according to the applied electrical field, i.e., a material exhibiting an electro-optic effect. In the Mach-Zehnder configuration, two optical interferometer paths are provided. An incoming optical carrier is split between the two optical paths. At least one path of the interferometer is phase modulated. When the signal is recombined at the output, the light from the paths either constructively or destructively interferes, depending upon the electrical field applied to the surrounding electrodes during the travel time of the carrier, creating an amplitude-modulated output optical signal.

Typically, the wavelengths emitted by optical transmitters 20 are selected to be within the 1500 nanometer range, the range in which the minimum signal attenuation occurs for silica-based fibers. More particularly, the wavelengths emitted by the optical transmitters are selected to be in the range from about 1540 to about 1560 nanometers. However, the optical transmitter wavelengths can be selected to correspond to the gain characteristics of the selected optical amplifiers. Consequently, when using amplifiers with a gain spectrum in a different region, the wavelengths of the optical transmitters are selected to be within that gain spectrum.

When optical transmitters 20 form part of an existing optical system, a plurality of remodulators can be employed. Such remodulators operate to map a space division optical communication system, i.e., a system in which individual optical signals are physically separated in space by transmission on separate waveguides, onto a wavelength division optical communication system, i.e., a communication system in which individual optical signals are simultaneously transmitted in the same waveguide by receiving an information-bearing optical signal at an input and outputting an optical channel having a carrier wavelength corresponding to a demultiplexer wavelength in a WDM optical system. The use of optical remodulators ensures compatibility of optical communication system 10 with currently-deployed transmission equipment. Further description of wavelength division multiplexed optical communication systems with remodulators is found in co-pending U.S. patent application Ser. No. 08/438,844, filed May 11, 1995 now U.S. Pat. No. 5,504,609, (Attorney Docket No. 100mab), the disclosure of which is incorporated by reference herein. Alternatively, the optical transmitters of the present invention can include the transimpedance amplifiers and clock/data recovery schemes depicted in the remodulators of the above-described patent application, with the corresponding elimination of the optical remodulators. Further description of optical transmitters which may be employed in the optical communication systems of the present invention are described in Gowar, Optical Communication Systems, incorporated by reference above. Generally, optical amplifiers (not shown) are used to increase the transmitted signal power following modulation.

Each information-bearing optical signal produced by an optical transmitter (or an optical remodulator, if present)

constitutes a channel in optical system 10, the wavelength of which corresponds to a demultiplexer wavelength in a receiving system. The optical signal channels output from transmitters 20 are brought together in optical combiner 30 for conveyance to optical waveguide 40. Optical combiner 30 is selected from any passive optical component which can combine plural wavelengths into a single output medium. Frequently, optical splitters used to divide a signal among plural outputs are used as optical combiners, operated in reverse fashion from the splitter. Exemplary optical combiners include 1×N passive splitters available from Corning, Inc., Corning, N.Y., 1×N wideband single mode splitters available from IOT Integrierte Optik GmbH, Waghausel-Kirrlach, Germany, and fused fiber combiners available from Gould, Inc., Millersville, Md. The combination of channels forms a multiplexed optical signal which is output to waveguide 40. Optical waveguide 40 is typically a single-mode optical fiber such as SMF-28, available from Corning, and TRUEWAVE, available from AT&T Corp., and is the principal transmission medium for the optical communication system. However, any optical waveguide which is capable of transporting multiple optical wavelengths can be employed as waveguide 40 in optical system 10.

Interposed along optical waveguide 10 are a plurality of optical amplifiers 50. Optical amplifiers 50 directly increase the strength of the multiplexed optical signal without the need for optical-to-electrical conversion. Optical amplifiers, their materials, and their operation are further described in Gowar, Ed. *Optical Communication Systems*, incorporated by reference above, Bjarklev, *Optical Fiber Amplifiers: Design and System Applications*, (Artech House, Norwood, Mass.), c. 1993, the disclosure of which is incorporated herein by reference, and in Desurvire, *Erbium-Doped Fiber Amplifiers*, (John Wiley & Sons, Inc., N.Y.), c. 1994, the disclosure of which is incorporated herein by reference. Exemplary optical amplifiers providing substantially uniform gain across a broad spectral region are described in conjunction with FIGS. 4–7 below.

Following transmission and amplification of the multiplexed optical signals along waveguide 40, each channel must be demultiplexed and routed to the receiver designated for the particular channel. The multiplexed signal is input to optical splitter 90 which places a portion of the multiplexed signal onto plural output paths 92. Each output path 92 optically communicates with a receiving system 100. Optical splitter 90 is selected from any optical device which can divide an input optical signal and place it onto plural output paths. Exemplary splitters include passive optical components such as those components described for use as optical combiner 30.

Figure 3:
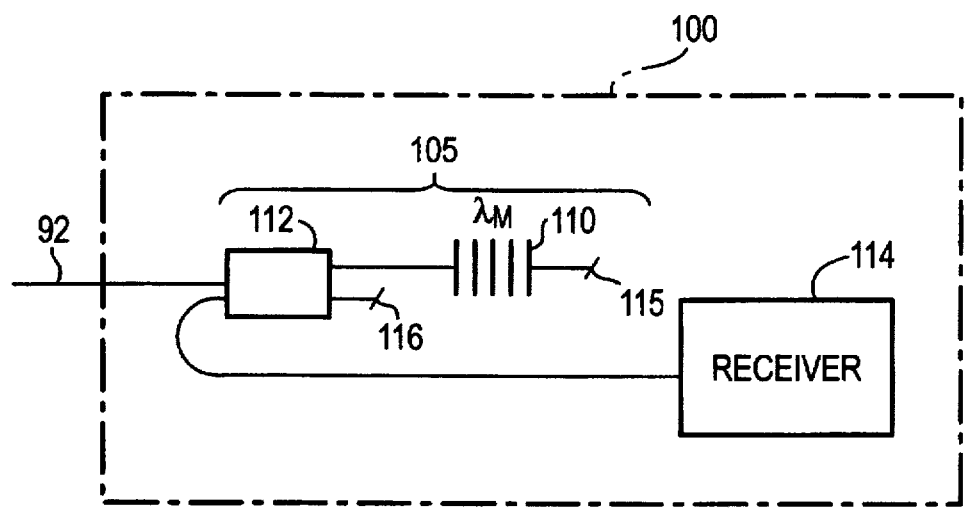
FIG. 3 is schematically illustrates a receiving system for use in the wavelength division multiplexed optical communication system of FIG. 2.

FIG. 3 schematically depicts an exemplary receiving system 100 for use in optical communication system 10. Receiving system 100 includes a demultiplexer 105 for selecting the particular channel from the multiplexed signal and outputting the selected channel to the receiver. To perform the channel selection, the multiplexed signal is routed to demultiplexer optical filter 110 through splitter 112. The optical filter passes optical signals having wavelengths other than the channel wavelength to be sent to the receiver. These non-selected channels pass through low reflectivity port 115 and exit the optical communication system. The low reflectivity port 115 is typically an angled fiber cut, although any low reflectivity waveguide termination technique may be employed. The channel wavelength is reflected by optical filter 110 to receiver 114 through splitter 112. The unused optical signals exit splitter 112 through low-reflectivity port 116.

In an exemplary embodiment, the optical filter comprises a Bragg grating member which reflects the selected channel wavelength and transmits all other wavelengths. Consequently, the channel wavelengths emitted by the remodulators are matched to the reflection wavelengths of the Bragg gratings incorporated in the receiving systems. Preferably, the Bragg grating comprises a series of photoinduced refractive index perturbations in an optical fiber which causes the reflection of optical signals within a selected wavelength band. Bragg gratings suitable for use in the optical system of the present invention are described in Morey et at., "Photoinduced Bragg Gratings in Optical Fibers," *Optics and Photonics News*, February 1994, pp. 8–14, the disclosure of which is incorporated by reference herein.

The reception channel wavelength is input to receiver 114 through splitter waveguide 113. Optionally, the signal may be optically amplified before it reaches the receiver. Receiver 114 generally detects the optical signal and converts it to an electrical signal, typically through the use of a photodiode device. Various optical receivers suitable for use in optical system 10 are described in Gowar, *Optical Communication Systems*, discussed above. In optical communication system 10, the receiver will frequently be part of an existing optical communication system to which the reception channel wavelength is routed. Consequently, the optical system 10 can function with numerous types of receivers to ensure compatibility with existing optical equipment.

Figure 1:
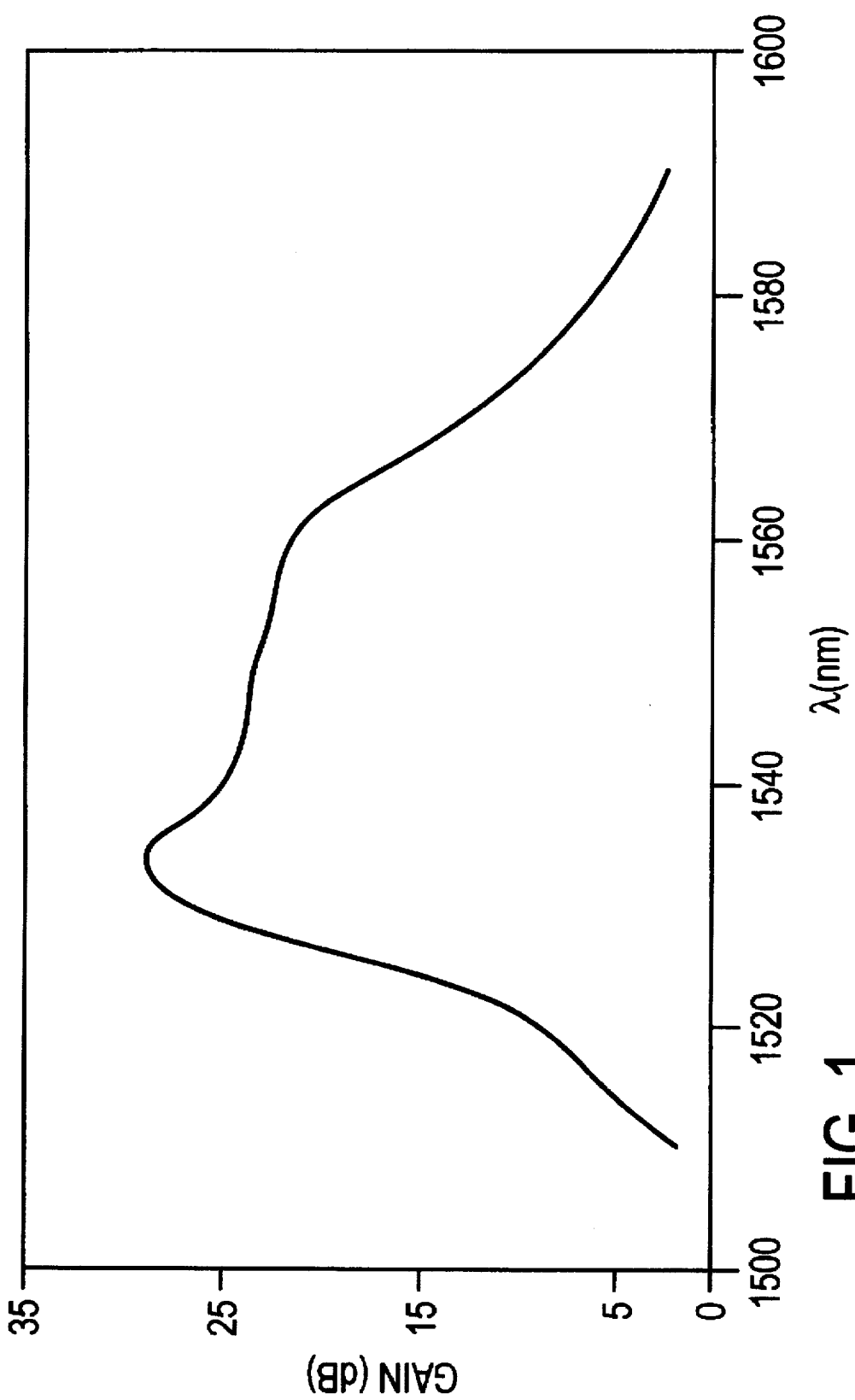
FIG. 1 depicts a typical gain profile for an erbium-doped optical fiber.
Figure 4:
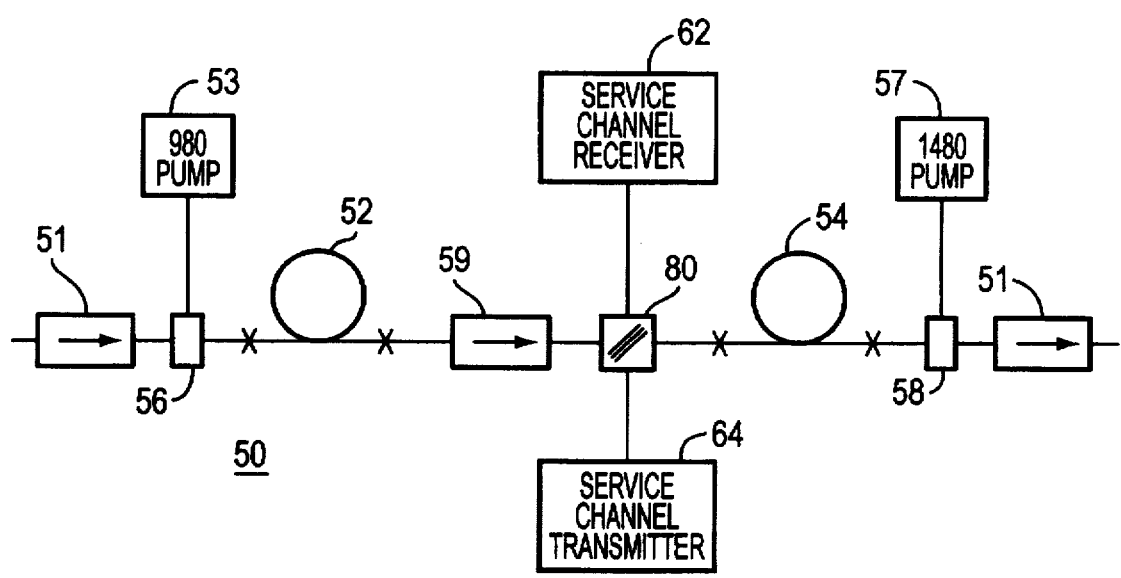
FIG. 4 is a schematic representation of an optical amplifier employed in the wavelength division multiplexed optical communication system of FIG. 2.

FIG. 4 illustrates an exemplary optical amplifier configuration having an amplifier gain spectrum which is uniform across a wide spectral region. Optical amplifier 50 includes a first and second amplifier stages 52 and 54. Each of the first and second stages includes a length of doped optical waveguide in which the dopant is selected from materials which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1500 nm and approximately 1590 nm provides gain to optical signals when the doped fiber is pumped, as depicted in FIG. 1. In the amplifiers of the present invention, AT&T erbium fiber E002S forms the rare-earth doped waveguides of the first and second stages.

In the optical amplifier of FIG. 4, pump connection elements 56 and 58 are provided to connect each stage of the amplifier with a source of optical pumping energy. Pump connection elements 56 and 58 are typically wavelength selective multiplexers which permit pump radiation to enter the doped fiber sections without allowing transmission channel radiation to pass into the pump. Optical pumping elements are generally selected from 980 and 1480 nm laser sources. In one embodiment, a 980 nm pump, depicted as element 53, can be used to pump the first stage of the amplifier while a 1480 nm pump, depicted as element 57, is used to pump the second stage of the amplifier. A single laser source, comprising single or multiple laser diodes, can be used to pump both fiber sections or to pump two amplifier stages located in separate optical amplifiers. Alternatively, separate laser sources, having the same or different pumping wavelengths, can be used to pump each fiber section. Further description of amplifier pumping schemes suitable for use in the wavelength division multiplexed optical communication system of the present invention is found in *Optical Fiber Amplifiers*, incorporated by reference above. Although the above-described pumping arrangements are exemplary, any pumping configuration which supplies sufficient power to the optical amplifier stages to create the desired gain can be used in the optical communication systems of the present invention.

To provide ASE noise suppression, isolator 59 is optionally positioned between the first and second amplifier stages. The amplifier stages are interconnected through interconnection element 80, selected to be a four-port wavelength division multiplexer. Multiplexer 80 includes at least one wavelength selective member 82 for selecting one or more optical service channels to enter and exit the communication system. Wavelength selective member 82 can be a multilayer thin film interference filter constructed to reflect an optical monitoring channel, particularly an optical service channel having a wavelength outside the gain band of the doped-fiber amplifier. Optionally, the interconnection element 80 includes means for selectively passing a particular wavelength range. In an exemplary embodiment, interconnection element selects wavelengths which are 1540 nm and above. The multilayer thin film interference filters 82 employed in the optical amplifiers of the present invention are commercially available from JDS-Fitel, Canada.

In an exemplary embodiment, member 82 reflects optical signals having a wavelength of 1650 nm, a wavelength outside the gain band of erbium-doped fiber amplifiers. In this embodiment, optical service channel is reflected towards service channel receiver 62, selected from the incident multiplexed optical signal. Simultaneously, service channel transmitter 64 injects a service channel at 1650 nm wavelength toward wavelength selective member 82 which reflects this channel onto the waveguide in the direction of the second doped fiber 54. The payload optical channels, i.e., those WDM signal channels having wavelengths within the gain band of the optical amplifier, pass through wavelength selective member 82 unaffected. Optionally, additional wavelength selective members can be positioned between member 82 and monitoring channel receiver 62 to reject any portion of the payload optical channel signals which are reflected towards the receiver.

While the interconnection element 80 is depicted as a multilayer interference filter, it is understood that a variety of interconnection elements can be positioned between the first and second amplifier stages, depending upon the overall WDM system configuration. For example, interconnection element 80 can be selected from optical circulators which include devices such as Bragg gratings configured for ASE reduction, as described in U.S. Pat. No. 5,283,626, the disclosure of which is incorporated herein by reference. Alternatively, other optical filtering elements can be used for interconnection element 80 depending upon wavelengths desired to pass through to the second amplifier stage. Additional elements may be used in conjunction with amplifier 50 such as the depicted isolators 51 at the amplifier input and output which exclude reflected optical signals. Other two-stage amplifier configurations which can be employed in the present invention are disclosed in U.S. patent application Ser. No. 08/457,292 now U.S. Pat. No. 5,532,864, assigned to the instant assignee, the disclosure of which is incorporated by reference herein.

As seen in FIG. 1, the amount of gain produced by a pumped erbium fiber is dependent upon the wavelength of the signal to be amplified. In particular, there is a large gain peak at 1531 nm. To produce the desired gain uniformity in a broad spectral region, the amplifier is optionally provided with a passive optical component to eliminate the gain spectrum in the region below 1540 nm. However, it is noted that removing the portion of the gain spectrum is optional, affecting only the level of uniformity which can be achieved according to the present invention. When a greater variation in the gain as a function of wavelength is tolerable, the entire region of the erbium gain spectrum may be used.

Figure 5A:
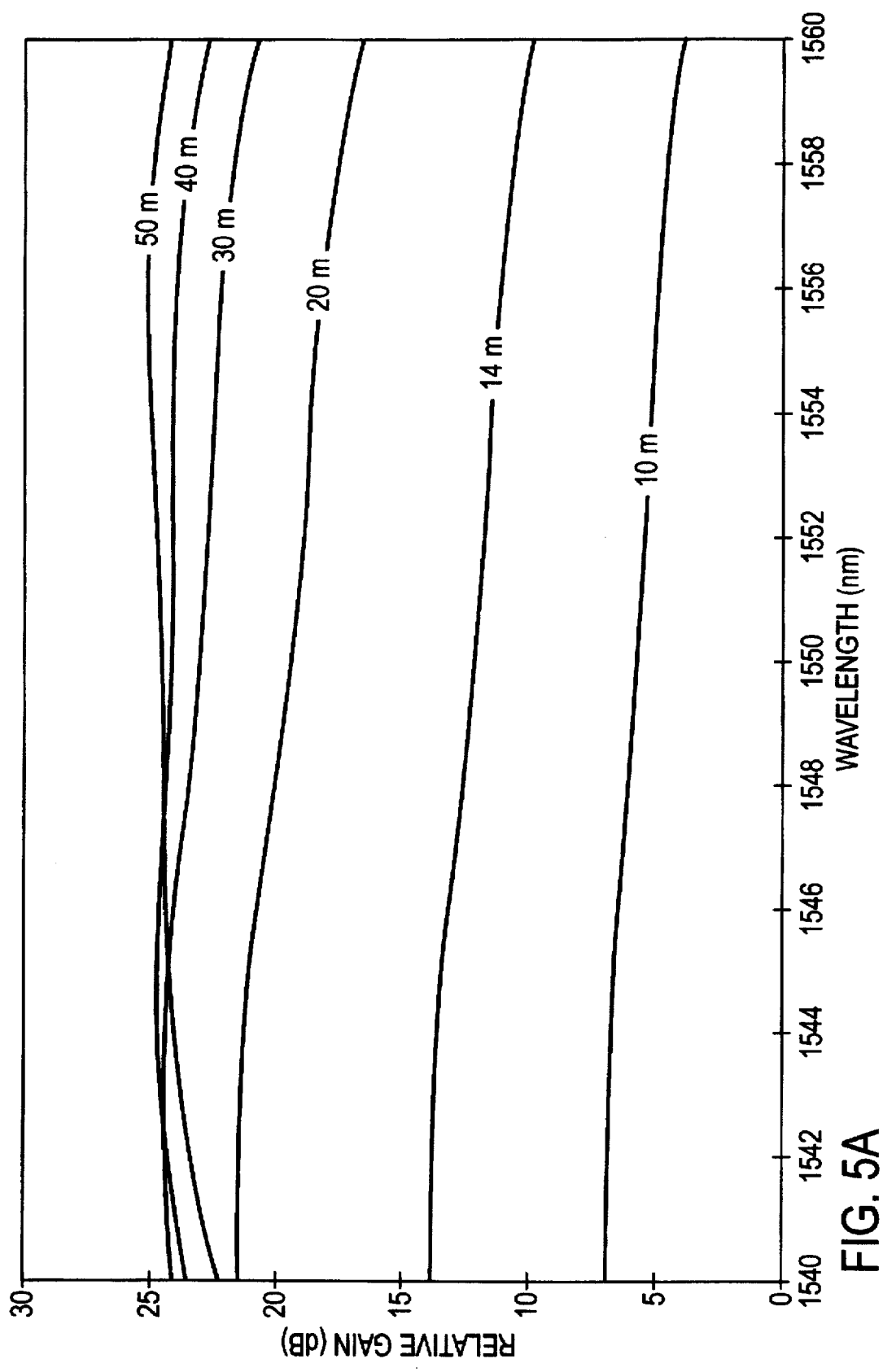
FIG. 5A is a graphical depiction of gain profiles for different lengths of erbium fiber in the first optical amplifier stage.
Figure 5B:
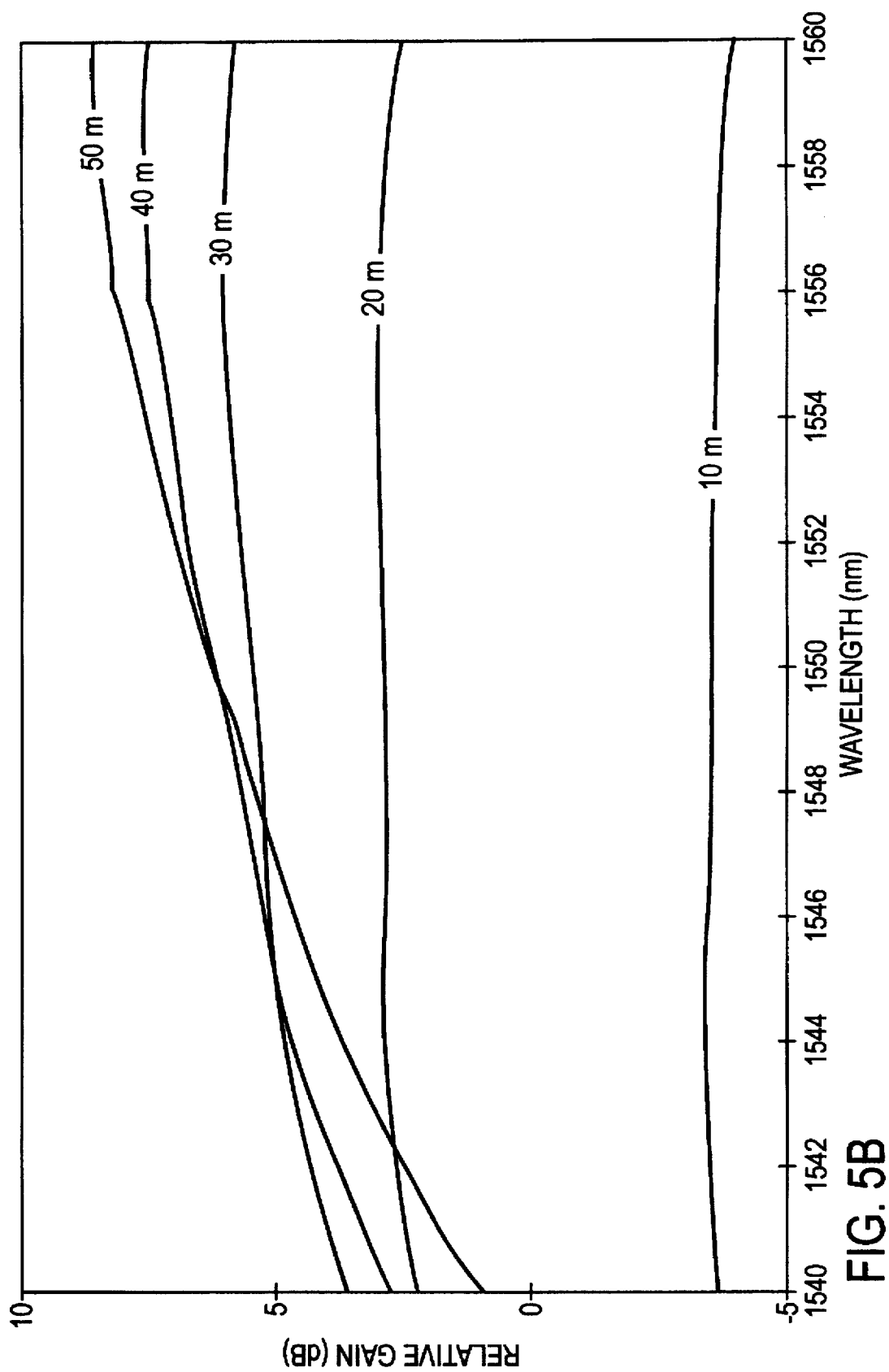
FIG. 5B is a graphical depiction of gain profiles for different lengths of erbium fiber in the second optical amplifier stage.

Gain in a doped-fiber amplifier is affected by a number of factors such as the type of dopant, length of fiber, pump wavelength, pump power, and the configuration of the amplifier (e.g., number of stages, presence or absence of filtering, counter or co-propagating pumping, etc.). Changing each of these variables while holding the remaining variables constant produces a family of gain curves for that particular variable. By studying the family of gain curves for each variable, a desired gain profile can be constructed. For a selected dopant, pump wavelength, pump power, and amplifier variations in the fiber length and pump power produce a family of gain curves having different shapes. Such a family of gain curves is depicted in FIGS. 5A and 5B for AT&T erbium doped optical fiber E002S. In FIG. 5A, a family of curves for the first stage of the optical amplifier is shown. In these gain profiles, the pump wavelength is 980 nm and the pump power is 70 mW while the length of the erbium fiber is varied from 10 to 50 meters. As seen in this FIG., the slope of the gain curves varies from a positive slope for a length of 50 m to a negative slope for lengths 40 m and below.

In FIG. 5B, a family of curves for the second stage of the optical amplifier is graphically depicted. In these gain profiles, the pump wavelength is 1480 nm and the pump power is 100 mW while the length of the erbium fiber is varied from 10 to 50 m. As the fiber length changes, the slope of the gain curves varies from a negative slope for a length of 10 m to a positive slope for lengths 20 m and greater.

Figure 6A:
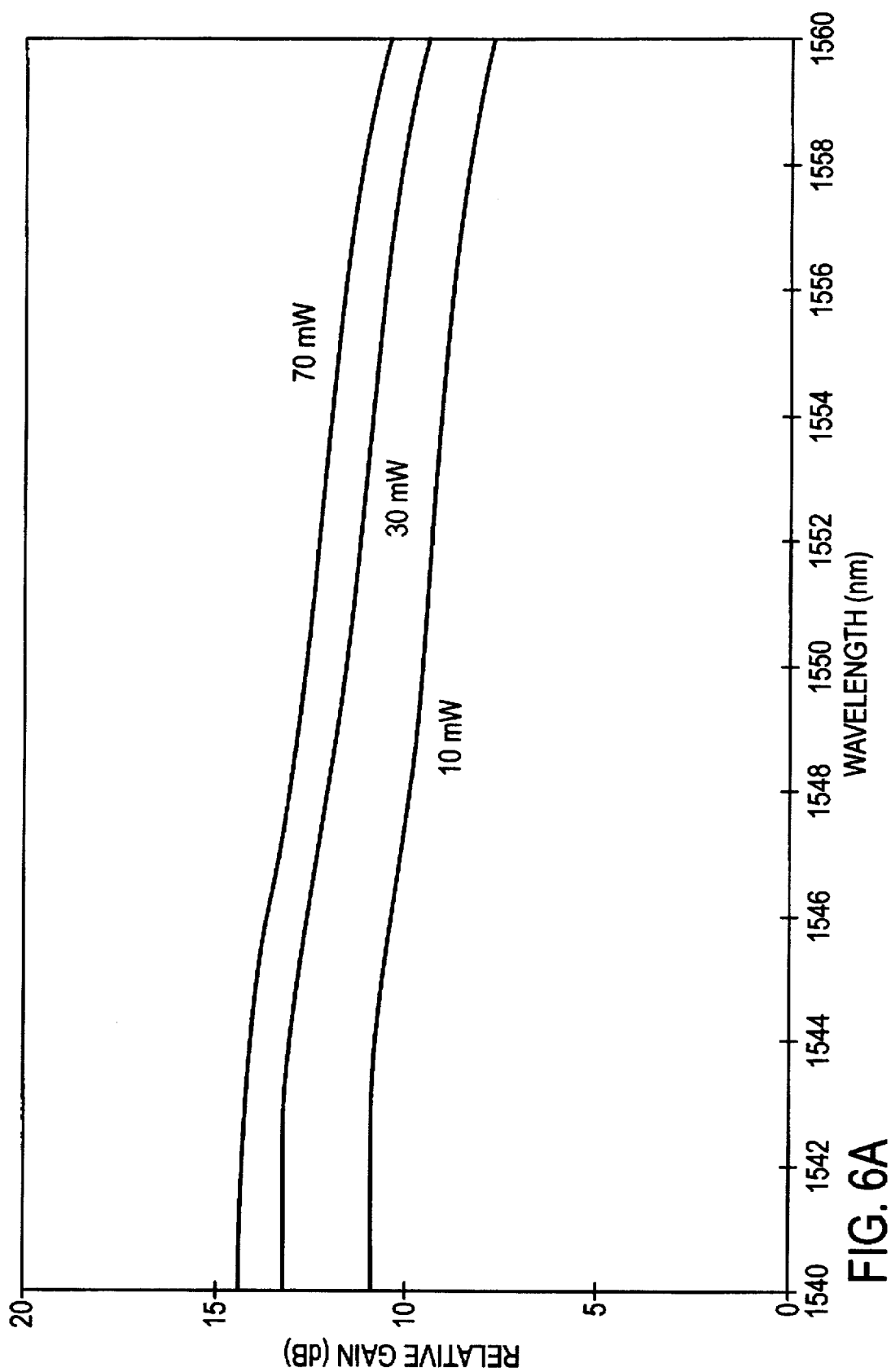
FIG. 6A is a graphical depiction of gain profiles for different pump powers in the first optical amplifier stage.
Figure 6B:
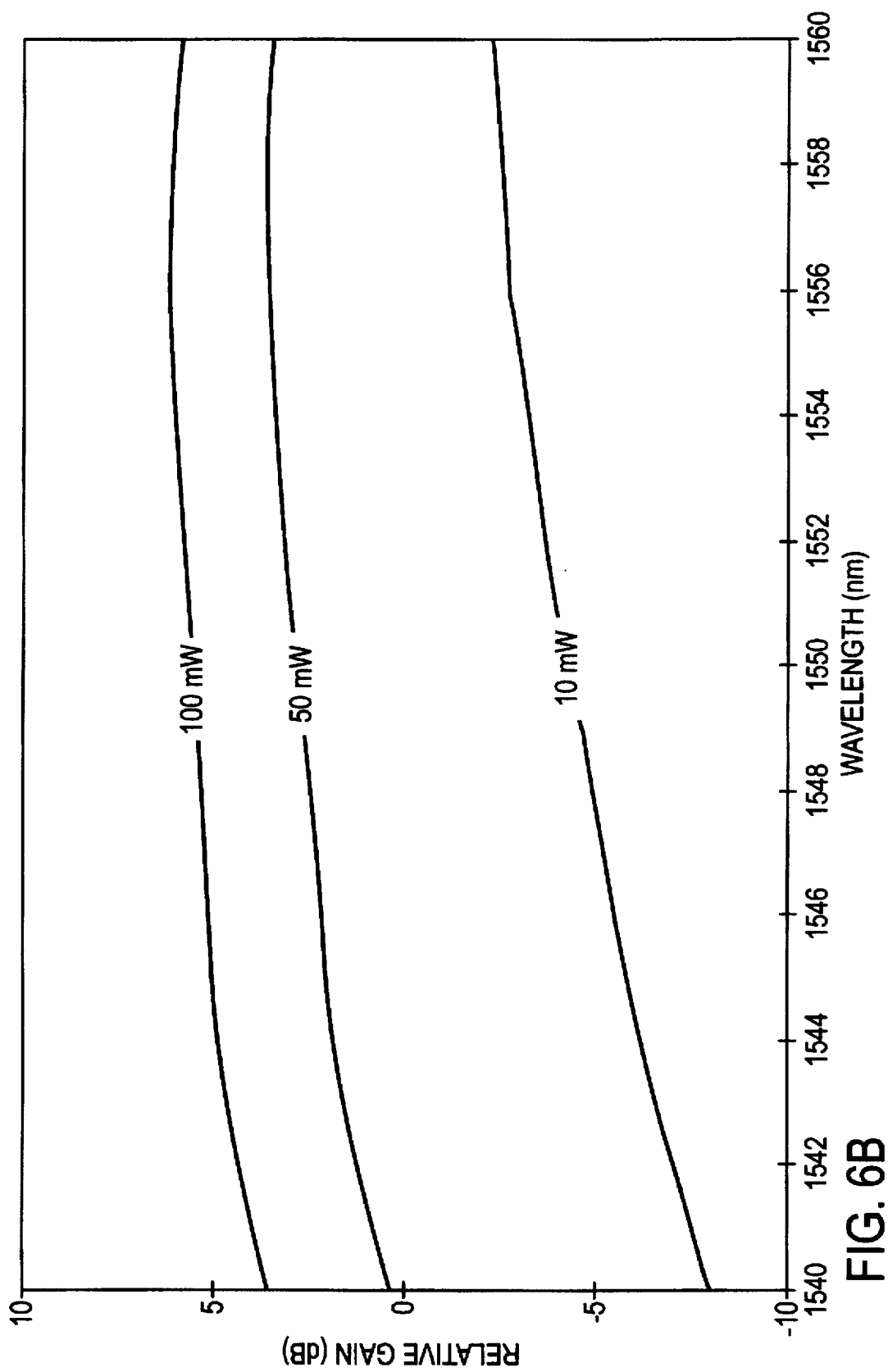
FIG. 6B is a graphical depiction of gain profiles for different pump powers in the second optical amplifier stage.

Similarly, a family of curves can be constructed in which the length of the gain-producing fiber is held constant while the pump power varies. Such a family of curves is depicted in FIG. 6 for the AT&T erbium fiber E002S. In FIG. 6A, the fiber length is 14 m and the pump wavelength is 980 nm as employed in the first stage of the optical amplifier of FIG. 4. The pump power is varied from 10 mW to 60 mW producing gain profiles of varying slopes. Similarly, in FIG. 6B a series of gain profiles is generated for the second stage of the optical amplifier of FIG. 4 in which the pump wavelength is 1480 nm and fiber length is 30 m. The pump power is varied from 10 mW to 100 mW, creating a series of gain profiles of varying slopes.

Figure 7:
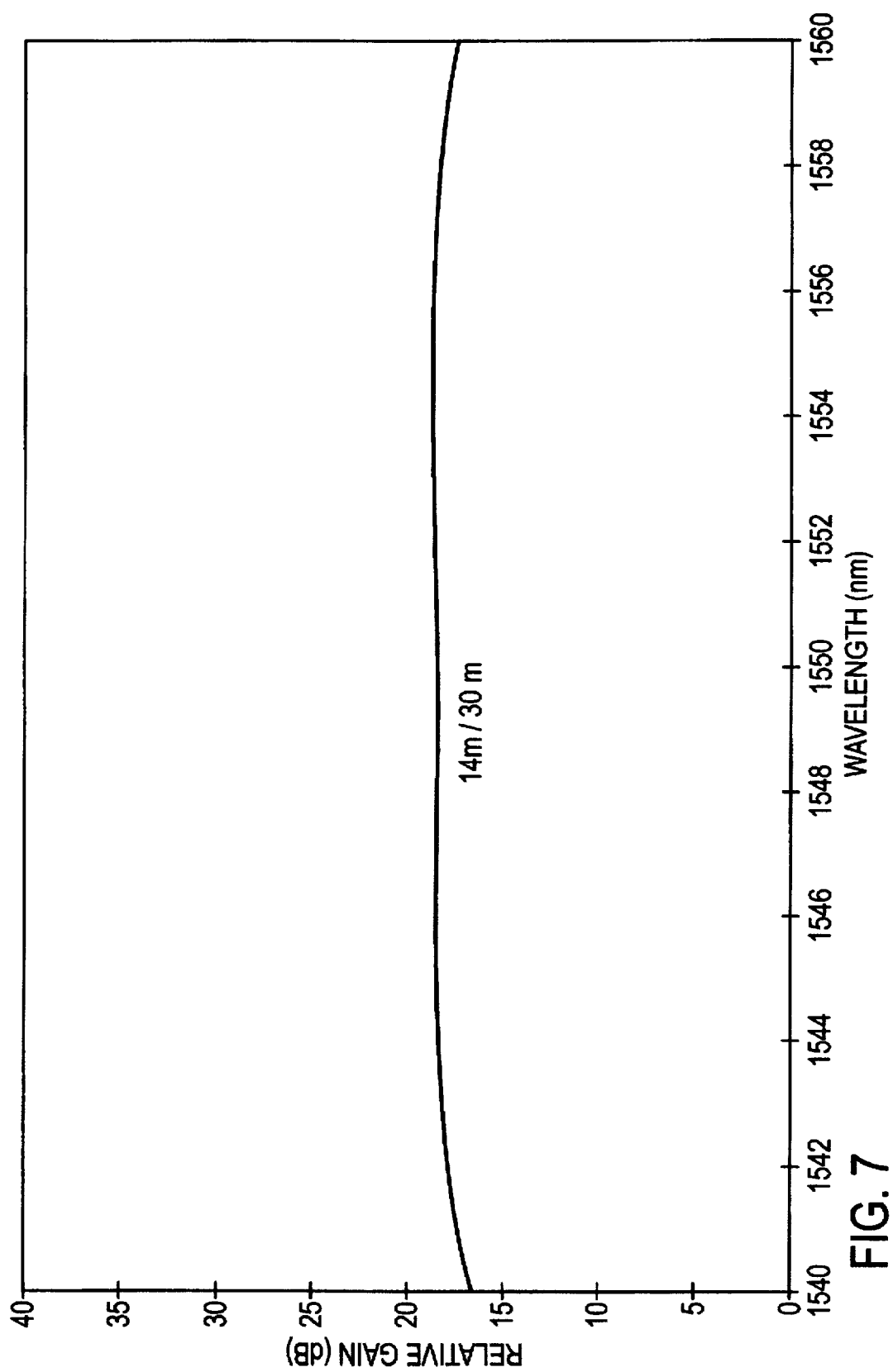
FIG. 7 is a schematic representation of the overall gain profile of a two-stage optical amplifier using first and second amplifier stages selected from the gain profiles depicted in FIG. 5A and FIG. 5B.

To construct an optical amplifier having an overall gain profile which is uniform in the desired spectral region, multiple stage amplifiers are constructed which advantageously combine amplifier stages having complementary profiles. Such an overall uniform amplifier profile is shown in FIG. 7 which combines a first stage having a 14 m length of erbium fiber pumped at 980 nm with a power of 70 mW with a second stage having a 30 m length of erbium fiber pumped at 1480 nm with a power of 100 mW. As seen from FIGS. 5A and 5B, the gain profiles for these two lengths of erbium fiber are complementary at the aforementioned pumping conditions. Consequently, when these two stages are combined in a single amplifier, the gain for that amplifier is substantially uniform in the range of the multiplexed optical communication signal, i.e., the range from about 1540 nm to about 1560 nm for the described WDM optical communication systems.

As seen from FIG. 7, the gain of the amplifier in the range from 1540 to 1560 nm varies less than 2 dB from the mean relative gain of approximately 18 dB. This uniformity makes the optical amplifiers particularly suitable for WDM applications, especially for dense WDM systems having narrow channel spacings. While the exemplary optical amplifiers of the present invention include two amplifier stages, the same technique can be used to construct optical amplifiers with more than two stages, each of the stages having a gain profile which contributes to an overall gain profile which is uniform across a spectral region of interest.

While the foregoing invention has been described in terms of the embodiments discussed above, numerous variations are possible. For example, many different operating parameters of the erbium doped fiber amplifiers may be varied to create gain profiles of different shapes which can be combined to construct optical amplifiers having an overall desired gain profile in a particular gain region for the selected doped fiber employed as the gain-producing medium. Additionally, the technique of creating families of gain profiles for each stage of an optical amplifier through incrementally varying a single operating parameter can be used for any material which produces an optical signal in response to pumping. Consequently, amplifiers employing a variety of optical materials can be constructed having uniform gain according to the techniques of the present invention. Accordingly, modifications and changes such as those suggested above, but not limited thereto, are considered to be within the scope of following claims.

What is claimed is:

1. A wavelength division multiplexed optical communication system comprising:
    a plurality of optical transmitters for outputting a plurality of optical signals, each optical signal having a particular wavelength;
    an optical combiner optically communicating with each of the optical transmitters for combining the optical signals and outputting the optical signals onto an output path to create a wavelength division multiplexed optical communication signal;
    an optical transmission line optically communicating with the output path of the optical combiner and configured to carry a wavelength division multiplexed optical communication signal;
    at least one optical amplifier positioned in the optical transmission line for substantially uniformly amplifying the wavelength division multiplexed optical communication signal and having at least first and second amplifier stages, the first amplifier stage including a first length of rare-earth doped optical fiber, the second amplifier stage including a second length of rare-earth doped optical fiber, the optical amplifier including at least one optical component positioned between the first and second amplifier stages selected from optical isolators, optical filters, optical circulators, Bragg gratings, and wavelength division multiplexers;
    a first optical pump for outputting a first pump signal at a first wavelength;
    a first optical pump path positioned between the first optical pump and the first stage of the optical amplifier for transporting pump energy to the first stage of the optical amplifier;
    a second optical pump for outputting a second pump signal at a second wavelength;
    a second optical pump path positioned between the second optical pump and the second stage of the optical amplifier for transporting pump energy to the second stage of the optical amplifier;
    wherein the first and second lengths of the rare-earth-doped optical fiber and the first and second optical pump signals are selected such that the gain of the first amplifier stage has a first gain slope within the spectral region from approximately 1540 nm to 1560 nm and the second amplifier stage has a second gain slope different from the first gain slope within the spectral region from approximately 1540 nm to 1560 nm, the first and second gain slopes being configured such that the composite of the first gain slope and the second gain slope yields a substantially constant amplifier gain within a spectral region from 1540 nm to 1560 nm.

2. A wavelength division multiplexed optical communication system as recited in claim 1 wherein the first gain slope of the first amplifier stage is negative and the second gain slope of the second amplifier stage is positive.

3. A wavelength division multiplexed optical communication system as recited in claim 1 wherein the rare-earth doped optical fiber is erbium-doped optical fiber.

4. A wavelength division multiplexed optical communication system as recited in claim 1 wherein the first pump wavelength is approximately 980 nm and the second pump wavelength is approximately 1480 nm.

5. A wavelength division multiplexed optical communication system as recited in claim 1 wherein the substantially constant gain of the optical amplifier within the spectral region from 1540 to 1560 nm is within 2 dB of the median gain for the region from 1540 to 1560 nm.

6. A wavelength division multiplexed optical communication system as recited in claim 1 wherein the optical component positioned between the first and second stages of the optical amplifier is an isolator.

7. A wavelength division multiplexed optical communication system as recited in claim 1 wherein the optical component positioned between the first and second stage of the optical amplifier is a multilayer interference filter.

8. A wavelength division multiplexed optical communication system as recited in claim 1 wherein the first length of rare earth-doped optical fiber is 14 meters and the second length of rare earth-doped optical fiber is 30 meters.

9. A wavelength division multiplexed optical communication system as recited in claim 1 wherein the first optical pump signal is approximately 980 nm and 70 mW and the second optical pump signal is approximately 1480 nm and 100 mW.

10. An optical amplifier configured to uniformly amplify plural optical wavelengths within a wavelength division multiplexed optical communication system comprising:
    an input for receiving a wavelength division multiplexed optical communication signal comprising plural optical signals, each optical signal at a different wavelength;
    at least first and second amplifier stages, the first amplifier stage including a first length of rare-earth doped optical fiber, the second amplifier stage including a second length of rare-earth doped optical fiber;
    at least one optical component positioned between the first and second amplifier stages selected from optical isolators, optical filters, optical circulators, Bragg gratings, and wavelength division multiplexers;
    a first optical pump for outputting a first pump signal at a first wavelength;
    a first optical pump path positioned between the first optical pump and the first stage of the optical amplifier for transporting pump energy to the first stage of the optical amplifier;
    a second optical pump for outputting a second pump signal at a second wavelength;

a second optical pump path positioned between the second optical pump and the second stage of the optical amplifier for transporting pump energy to the second stage of the optical amplifier;

the first and second lengths of the rare-earth-doped optical fiber and the first and second optical pump signals being selected such that the gain of the first amplifier stage has a first gain slope within the spectral region from approximately 1540 nm to 1560 nm and the second amplifier stage has a second gain slope different from the first gain slope within the spectral region from approximately 1540 nm to 1560 nm, the first and second gain slopes being configured such that the composite of the first gain slope and the second gain slope yields a substantially constant amplifier gain within a spectral region from 1540 nm to 1560 nm.

11. An optical amplifier as recited in claim 10 wherein the first gain slope of the first amplifier stage is negative and the second gain slope of the second amplifier stage is positive.

12. An optical amplifier as recited in claim 10 wherein the rare-earth doped optical fiber is erbium-doped optical fiber.

13. An optical amplifier as recited in claim 10 wherein the first pump wavelength is approximately 980 nm and the second pump wavelength is approximately 1480 nm.

14. An optical amplifier as recited in claim 10 wherein the substantially constant gain of the optical amplifier within the spectral region from 1540 to 1560 nm is within 2 dB of the median gain for the region from 1540 to 1560 nm.

15. An optical amplifier as recited in claim 10 wherein the optical component positioned between the first and second stages of the optical amplifier is an isolator.

16. An optical amplifier as recited in claim 10 wherein the optical component positioned between the first and second stage of the optical amplifier is a multilayer interference filter.

17. An optical amplifier as recited in claim 10 wherein the first length of rare earth-doped optical fiber is 14 meters and the second length of rare earth-doped optical fiber is 30 meters.

18. An optical amplifier as recited in claim 10 wherein the first optical pump signal is approximately 980 nm and 70 mW and the second optical pump signal is approximately 1480 nm and 100 mW.

* * * * *